UNITED STATES PATENT OFFICE.

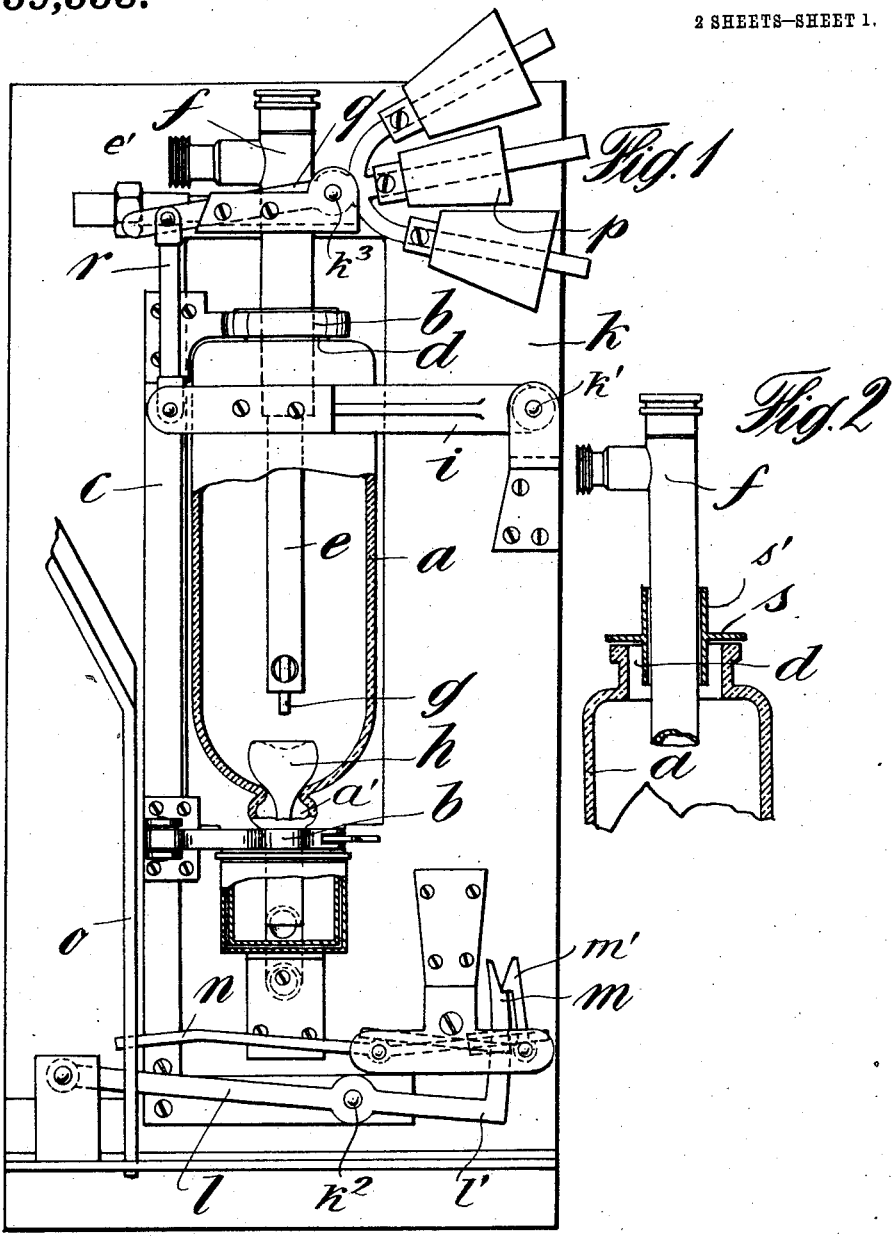

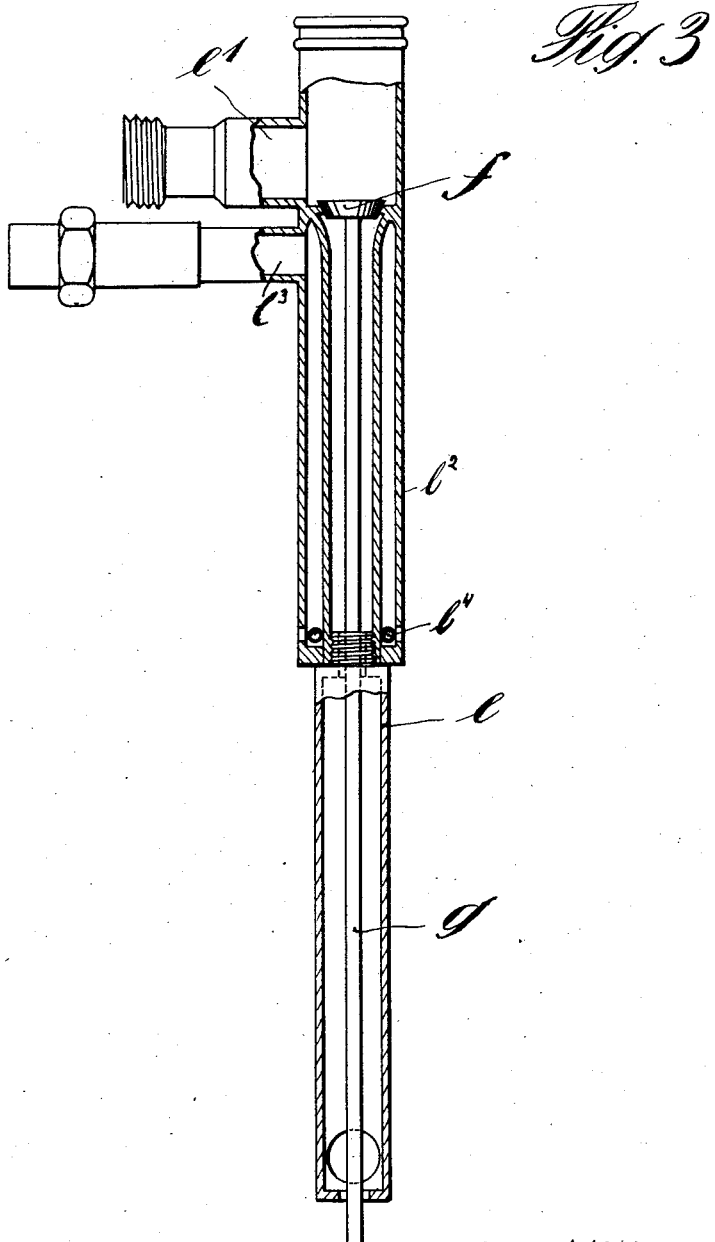

JOSEPH MEYER, OF BERLIN, GERMANY.

WEIGHING APPARATUS FOR LIQUIDS.

1,059,553. Specification of Letters Patent. Patented Apr. 22, 1913.

Application filed May 23, 1911. Serial No. 629,060.

*To all whom it may concern:*

Be it known that I, JOSEPH MEYER, a subject of the King of Prussia, and resident of Berlin, Germany, have invented new and useful Improvements in Weighing Apparatus for Liquids, of which the following is a specification.

This invention relates to an apparatus by which liquid may automatically be weighed.

The invention consists in the peculiar construction of the apparatus whereby the friction of its single parts is reduced to the utmost limit.

My invention is illustrated on the accompanying drawings in which—

Figure 1 is an elevation of the apparatus partly in section, Fig. 2 is a modification, and Fig. 3 shows in an enlarged scale the supply valve.

With reference to the drawings $a$ is the weighing vessel. The same, with its neck- and base-portion, by means of two clamps $b$ is fastened to a vertically movable L-shaped frame $c$. Through the neck opening $d$ of said vessel $a$ there passes the inlet pipe $e$ for the liquid to be weighed. This pipe (Fig. 3) is provided at its top-end with a valve $f$ which may be opened by an upward movement of a rod $g$. The outlet $a^1$ of the vessel $a$ is controlled by a floating cone $h$ preferably formed of glass.

At its upper end the L-shaped frame $c$ is kept in position by an arm $i$ the other end of which is pivoted to the frame $k$ of the apparatus at $k^1$. The lower end of the L-shaped frame $c$ is held by means of a lever $l$. This latter is pivoted to the frame $k$ at $k^2$. The free arm $l^1$ of the lever $l$ may be caught with its upright end $m$ by means of a hook $m^1$ controlled by a lever $n$. The free end of the latter movably passes a coin channel $o$ of well known construction.

The weight of the vessel $a$ and that of its parts is balanced by a number of counter-weights $p$ arranged upon a scale beam $q$ pivoted to the frame $k$ at $k^3$. The free arm of the scale beam $q$ is in connection with the L-shaped frame $c$ by means of a link $r$.

The vessel $a$ (Fig. 2) advantageously is closed by a cover $s$ provided with a central sleeve $s^1$ sliding along the pipe $f$.

The apparatus operates as follows: The liquid to be weighed enters the stud $e^1$ of the pipe $e$. The entrance of the latter is closed by the valve $f$. A coin is put into the channel $o$. This coin is prevented from passing said channel $o$ by the free end of the lever $n$, and by the weight of the coin the lever $n$ is pressed down. The other end of the lever $n$ lifts the free end of the angular lever $m^1$ and thereby the end $m$ of the lever $l$ $l^1$ is freed. Under the action of the counter-weights $p$ the L-shaped frame $c$ with the vessel $a$ now is lifted. The top of the cone $h$ contacts the lower end of the rod $g$ whereby the valve $f$ is opened. The liquid now enters the pipe $e$ and runs into the vessel $a$ until the latter is lowered by the weight of the liquid flowing in. On this lowering movement of the vessel $a$ the valve $f$ is again closed, and the cone $h$ floats so that the liquid flows off through the outlet $a^1$. In this particular portion the pipe $l$ is surrounded by a shell $l^2$ provided with an inlet pipe $l^3$ and a number of outlet openings $l^4$ for the purpose of enabling the cleansing or washing of the vessel $a$ by means of a water spray.

Having now described the nature of my invention what I claim is:—

1. In means for automatically weighing liquids, in combination, a weighing vessel open at its upper and lower ends, a vertically movable support therefor, movable guiding arms engaging the upper and lower ends of said support, a lever provided with counterweights operatively connected to said support, an inlet pipe passing through the opening in the upper end of said vessel, a valve therefor, a floating cone normally closing the lower opening of said vessel, and means actuated by said cone as the vessel is raised to open said valve.

2. In means for automatically weighing liquids, in combination, a weighing vessel open at its upper and lower ends, means for moving said vessel vertically, an inlet pipe provided with a valve and passing through the upper opening of the vessel, a valve rod passing through said pipe and projecting from the lower end thereof, and a floating cone normally closing the lower opening of
5 the vessel and adapted to engage the lower end of said valve rod to open said valve as the vessel is raised.

In witness whereof I have hereunto set my hand in the presence of two witnesses.

JOSEPH MEYER.

Witnesses:
 HENRY HASPER,
 WOLDEMAR HAUPT.

Copies of this patent may be obtained for five cents each, by addressing the "Commissioner of Patents, Washington, D. C."